United States Patent
Lieberman et al.

(10) Patent No.: US 10,459,823 B1
(45) Date of Patent: Oct. 29, 2019

(54) DEBUGGING USING DUAL CONTAINER IMAGES

(71) Applicant: EMC Corporation, Hopkinton, MA (US)

(72) Inventors: Amit Lieberman, Raanana (IL); Jehuda Shemer, Kfar Saba (IL); Assaf Natanzon, Tel Aviv (IL); Leehod Baruch, Herzliya (IL); Ron Bigman, Holon (IL)

(73) Assignee: EMC IP Holding Company LLC, Hopkinton, MA (US)

(*) Notice: Subject to any disclaimer, the term of this patent is extended or adjusted under 35 U.S.C. 154(b) by 246 days.

(21) Appl. No.: 15/197,157

(22) Filed: Jun. 29, 2016

(51) Int. Cl.
G06F 11/36 (2006.01)

(52) U.S. Cl.
CPC .................. G06F 11/362 (2013.01)

(58) Field of Classification Search
CPC .................................................... G06F 11/362
USPC ......................................................... 717/124
See application file for complete search history.

(56) References Cited

U.S. PATENT DOCUMENTS

| | | | |
|---|---|---|---|
| 7,992,133 B1* | 8/2011 | Theroux | G06F 11/3664 709/201 |
| 9,661,011 B1* | 5/2017 | Van Horenbeeck | H04L 63/1425 |
| 2012/0051229 A1* | 3/2012 | Feldmann | H04L 43/04 370/242 |
| 2016/0034372 A1* | 2/2016 | Panda | G06F 11/3414 714/33 |
| 2017/0329588 A1* | 11/2017 | Lundberg | G06F 8/70 |
| 2017/0344462 A1* | 11/2017 | Vecera | G06F 11/3668 |
| 2017/0353496 A1* | 12/2017 | Pai | H04L 63/20 |

OTHER PUBLICATIONS

U.S. Appl. No. 14/978,351, Storing Application Data as an Enhanced Copy, filed Dec. 22, 2015 by Assaf Vatanzon, et al.

* cited by examiner

Primary Examiner — Chat C Do
Assistant Examiner — Bradford F Wheaton
(74) Attorney, Agent, or Firm — Womble Bond Dickinson (US) LLP

(57) ABSTRACT

A problem that occurs during execution of an application is debugged by building a lightweight container image and an enhanced container image. Data traffic for debugging is selected and the selected data traffic is copied using an enhanced copy. The problem is debugged using the enhanced container image and the selected data traffic.

21 Claims, 3 Drawing Sheets

DEBUGGING USING DUAL CONTAINER IMAGES

FIELD

The disclosure herein generally relates to debugging, and particularly relates to debugging of a problematic behavior or bug that occurs during execution of an application.

BACKGROUND

The process of finding and fixing a problem (i.e., a coding error or bug) in a computer program or application is often a large part of software development. Typically, in order to debug such a problem during production, the problem must be reproduced so that a developer or user can investigate. Once a problem is reproduced, it must be debugged and fixed.

Some providers of cloud computing platforms provide a suite of software components (e.g., Google App Engine, OpenShift, and CloudFoundry), sometimes referred to as a software stack, that an application developer can install on a virtual machine. The software stack provides a Platform-as-a-Service (PaaS) layer that contains functionality to support the developer's application. The PaaS layer can include functionality for testing, debugging, database integration, security management, health management, incremental updates, and auto scaling of the application.

In PaaS platforms, container technologies are often used to deploy application components to production. In this regard, application components may run in a container on a physical or virtual machine providing hardware virtualization. A container emulates an operating system environment. Containers allow developers to have "dev/prod parity", such that the software components deployed in production act the same as they do during development. One example implementation of containers is provided by the Docker project. The project provides a container engine that can instantiate containers on a machine and take down containers that are no longer needed.

BRIEF DESCRIPTION OF THE DRAWINGS

The embodiments of the disclosure herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
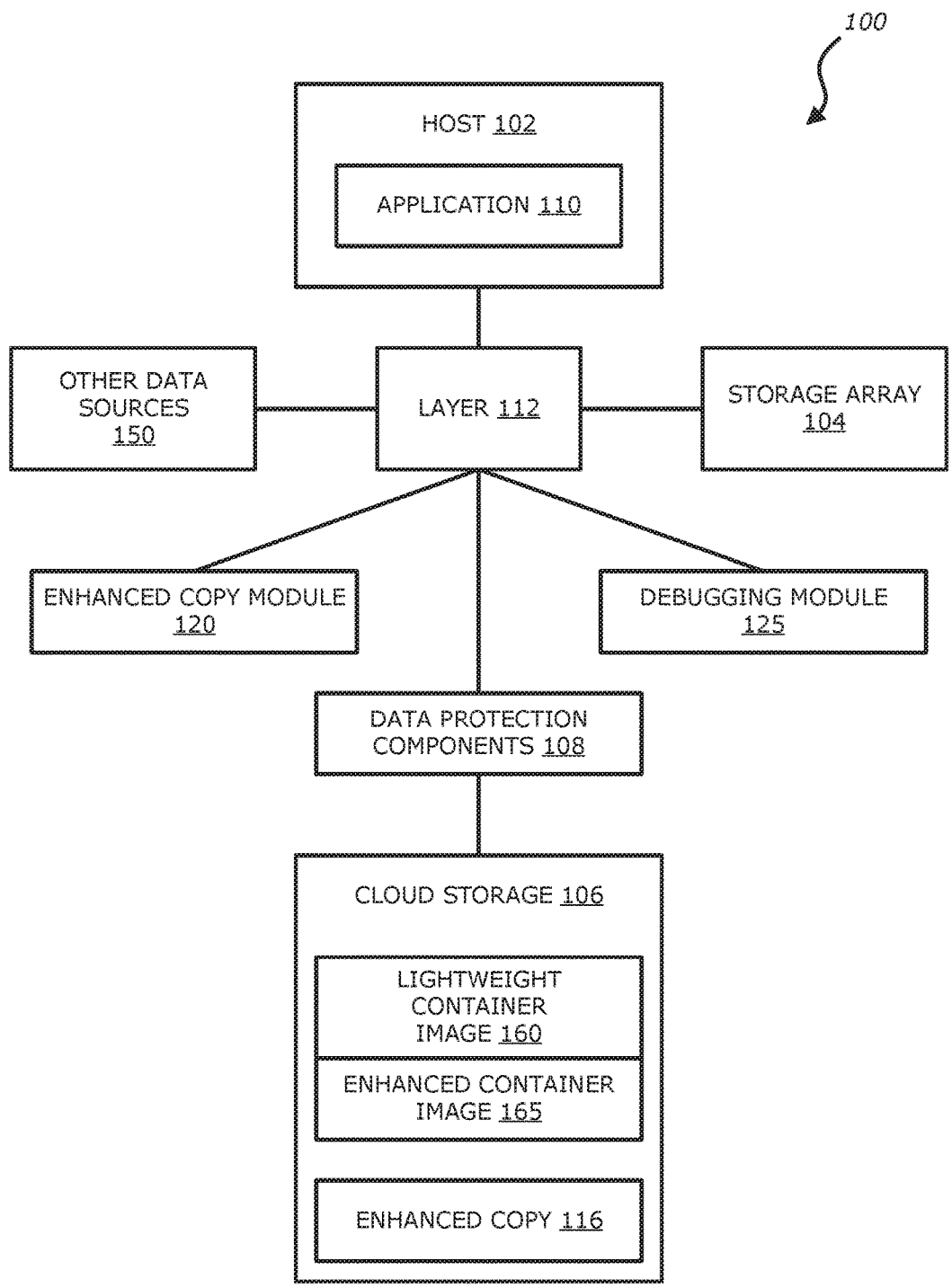
FIG. 1 is a block diagram for explaining an example system for explaining debugging according to an embodiment herein.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As used herein a "container" is a software component that hosts other software components. Typically, a container is implemented as an isolated user space instance. Software containers are sometimes referred to as virtualization engines (VE), virtual private servers (VPS) or jails. A container provides execution support to the software components it hosts in a way that is similar to an operating system hosting processes. A container can serve as a protective barrier, monitoring the interactions between hosted components and remote software components outside of the container, restricting the interactions to those that are deemed safe.

A container may be deployed on a virtual or physical machine, such as directly on a developer's laptop (referred to as a "bare metal" deployment) or on a virtual machine provided by a data center. As discussed above, certain projects provide a PaaS layer that provides a software stack having the operating system, libraries, and configuration to support an application.

A container provides the generic execution environment in which to develop and deploy an application, but also isolates the application from other applications (or even from the rest of the machine's operating system environment). Thus, two applications can run in two different containers. If the containers are on the same machine, they run as two software processes that are isolated from each other. Deploying applications in different software containers is also more efficient than deploying them in different virtual machines. For example, while the container may need to emulate an operating system environment with its own user space, file system, and memory, it may not need to emulate processing, storage, and networking resources. The container may rely on the underlying machine for such resources. Thus, a container image can be smaller than a virtual machine image and more efficient to deploy. A container image is a template of a container that may be run on one or more hosts. Often, PaaS services are described as templates of container images having relationships between them.

Often, containers are constructed to be efficient for use during production of an application to build small computing components that are scalable and do not consume many resources, as compared to a full virtual machine or a physical box. For example, a container may be optimized to contain only the capabilities and functions needed to run an application instead of containing an entire operating system, such that the container is lightweight. In contrast, servers used by a developer for production and development of an application typically include an entire operating system. When using such lightweight containers, there are situations in which tools that are typically available to developers on production servers are not included in the container, such as capabilities to test and debug the application.

Generally, the present disclosure relates to debugging a problem using dual container images, namely a lightweight container image constructed to be efficient for use during production and an enhanced container image including capabilities that allow a developer to test and debug, and orchestrating data traffic and workloads to be used for the debugging.

By virtue of the arrangements illustrated herein, it is typically possible to debug a problem that occurs during execution of an application using an enhanced container without sacrificing performance efficiency of a lightweight container used during production of the application.

FIG. 1 illustrates a block diagram for explaining an example system for debugging according to an embodiment herein. Referring to FIG. 1, the system 100 includes a host 102, a storage array 104, a cloud storage 106, data protection components 108, a layer 112 and other data sources 150 (e.g., object stores, databases, volumes and so forth). The host 102 includes an application 110.

In one example, the layer 112 includes at least one of a block storage API (application programming interface), an object storage API, a key/value API, a file system API, a database API and a messaging API.

System 100 further includes a debugging module 125 constructed to perform debugging, including identification and reproduction of a bug. According to one example embodiment, debugging module 125 accesses an enhanced container image (such as enhanced container image 165 stored in cloud storage 106) for debugging of an application component. While the debugging module 125 is shown as a separate block in FIG. 1, in other examples, the debugging module 125 may be located anywhere in system 100 including being in the layer 112.

In the embodiment explained using FIG. 1, lightweight container image 160 and enhanced container image 165 are stored in cloud storage 106. In other embodiments, lightweight container image 160 and enhanced container image 165 may be stored in a registry. As one example, the registry may be a Docker Hub provided by the Docker project.

Lightweight container image 160 is constructed to be efficient for deploying an application component to production. Production of the application refers to deployment of the application to real-world users outside of a testing and development environment. Generally, lightweight container image 160 includes fewer capabilities than enhanced container image 165. For example, lightweight container image 160 may include an operating system having fewer capabilities than an operating system of enhanced container image 165, such that lightweight container image 160 performs faster and more efficiently. In this regard, container images 160 and 165 run using the same operating system. However, the version of the operating system contained in lightweight container image 160 may provide less capabilities than that of enhanced container image 165.

In one embodiment, lightweight container image 160 does not include capabilities related to testing and debugging of an application. In some embodiments, lightweight container image 160 does not include an entire operating system. In other embodiments, lightweight container image 160 only contains the capabilities needed to run an application.

Enhanced container image 165 has the same deployment as lightweight container image 160 but includes additional supportability features and capabilities needed to maintain the application, such as testing and debugging. In addition, enhanced container image 165 is built using the same application version as used to build lightweight container image 160, such that the container images have duality. In this regard, in situations where the container images are stored in a registry, numerous versions of an application may be stored, and the same application version is used to build lightweight container image 160 and enhanced container image 165. Building of the container images is discussed in more detail below in connection with FIG. 2.

By virtue of using enhanced container image 165, it is typically possible to maintain an application during deployment, since enhanced container image 165 includes the capabilities to by debug and resolve problems that occur during execution of the application. For example, when a request is received to debug a workflow, enhanced container image 165 may be accessed and used, rather than lightweight container image 160. Thus, enhanced container image 165 may be considered a container to aid in maintenance of the application.

In one embodiment, enhanced container image 165 is constructed without being concerned with efficiency or performance speed. In one embodiment, enhanced container image 165 includes debug information that is used to debug the application. In one embodiment, enhanced container image 165 includes source code of the application, such that is easier for a developer to debug the source code. In this embodiment, a visual editor may also be provided for installation so that the source code may be opened, viewed and debugged. In one embodiment, enhanced container image 165 includes one or more network ports that are open for remote connection to additional resources, such as databases, object stores, data volumes, file systems, or any other service. In one embodiment, enhanced container image 165 includes an interface enabling remote connection to the physical machine or box. In one embodiment, enhanced container image 165 includes full versions of any script that has been obfuscated. In this regard, a script may be minimized and obfuscated during production such that it may be difficult to debug. In one embodiment, enhanced container image 165 includes an integrated development environment (IDE) having additional support for developing an application, including forms designers and resource editors, compiling and debugging applications. In one embodiment, enhanced container image 165 includes an agent (i.e., a metrics controller) that is constructed to monitor the enhanced container image 165 and to collect metrics about execution of the application on enhanced container image 165. In one embodiment, enhanced container image 165 includes a base container having a version of the operating system (the same operating system used by enhanced container image 165 and lightweight container image 160) including process monitoring tools. In one embodiment, enhanced container image 165 includes uncompressed encrypted binaries. In this regard, a binary that is uncompressed and encrypted may be a computer-executable program that has been uncompressed and encrypted. In this case, the binary may also include dynamic libraries. A binary may also be composed of any file that includes a digital representation of data.

System 100 also includes an enhanced copy module 120 constructed to generate an enhanced copy 116. While the enhanced copy module 120 is shown as a separate block in FIG. 1, in other examples, the enhanced module 120 may be located anywhere in system 100 including being in the layer 112.

Cloud storage 106 stores the enhanced copy 116. An enhanced copy 116 includes application data and other data to be able to regenerate data. For example, other data may include the application and the whole operating environment which may include run time environment, run time parameters, data, data copies and any other data needed for the application 110 to operate.

Accordingly, in one example embodiment, the enhanced copy 116 includes application data, the application, application configuration and runtime settings. For example, the enhanced copy 116 may include an executable image of a particular version that was running at the time of the copying, application data that was being accessed by the application, and application metadata describing the circumstances of the application and the application data. In some examples, application data is a consolidation copy of data sources of the application. These data copies may be generated using existing backup/replication technologies or any other method and are in some examples a set of different copies of different sources.

With respect to application metadata, in some embodiments, the enhanced copy 116 further includes metadata including metadata on application operational parameters (which describe how to run the application), number of instances, scale out parameters, and availability information. The application metadata may describe an operating environment that hosted the application (e.g., a processor, a memory, a storage device, a network interface, etc. involved at the time). In one embodiment, metadata includes parameters to connect to additional resources, such as databases, object stores, data volumes, file systems, or any service that application was consuming at the time. In some embodiments, the metadata may further include metadata providing information about resources used by the application, for example IDs, names, and/or types. In one embodiment, the metadata further includes metadata controlling the execution of the application at the time. In another example, the metadata further includes metadata related to enhanced copy 116 itself, for example the timestamp, sizes, technologies, and compression/archiving types. In some embodiments, the application metadata may further include parameters controlling whether to restore all of the above features/services, or partial of the features/services, restore only the data instead of the executable image of the application. The parameters may also control the way the runtime environment is set up. For example, a restoration for a development environment may not restore all the runtime services or may restore them at a lower service level agreement (SLA), etc.

In some examples, the application itself is stored to be able to restore and access the data with the correct application version of a particular point in time, which according to one embodiment includes the application itself and the applications that generated the data copies. In some example embodiments, the application configurations enable the application to be run from the enhanced copy. In some examples, runtime settings enable the environment to be mimicked, including allocation of proper processing resources (e.g., processor, memory, storage, operating system, network stack, proper system clock). Certain services that were utilized or connected with may also be restored based on the application metadata. It is therefore possible to restore a full working copy of the application of a particular point in time, rather than just the application data.

According to one example, when an application is restored, an operating environment or execution environment will be established and configured based on the application metadata, including allocating proper resources, even setting up a system clock reflecting the time of the capture and copying. A virtual machine may be provisioned and configured based on the application metadata, which mimics substantially the same operating environment at the time of the copying or capturing of the corresponding snapshot. An executable image of the application is then executed within the operating environment and the application data is loaded into the memory and accessible by the application.

It is therefore advantageously possible create a copy of the application in which the configurations, settings and environment (including clocks) appear to the developer to be moved back to those of the run time environment at the time of interest (e.g., the time at which the problem or bug was detected), even if available services have changed or been removed. In fact, it becomes possible to provide the developer with a copy of the application where the environment is identical to the environment at the time of the problem or bug.

For more detail, see U.S. patent application Ser. No. 14/978,351 filed Dec. 22, 2015 by Assaf Natanzon, et al., the contents of which are incorporated by reference herein.

Note that some or all of the components as shown and described above (e.g., debugging module 125) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
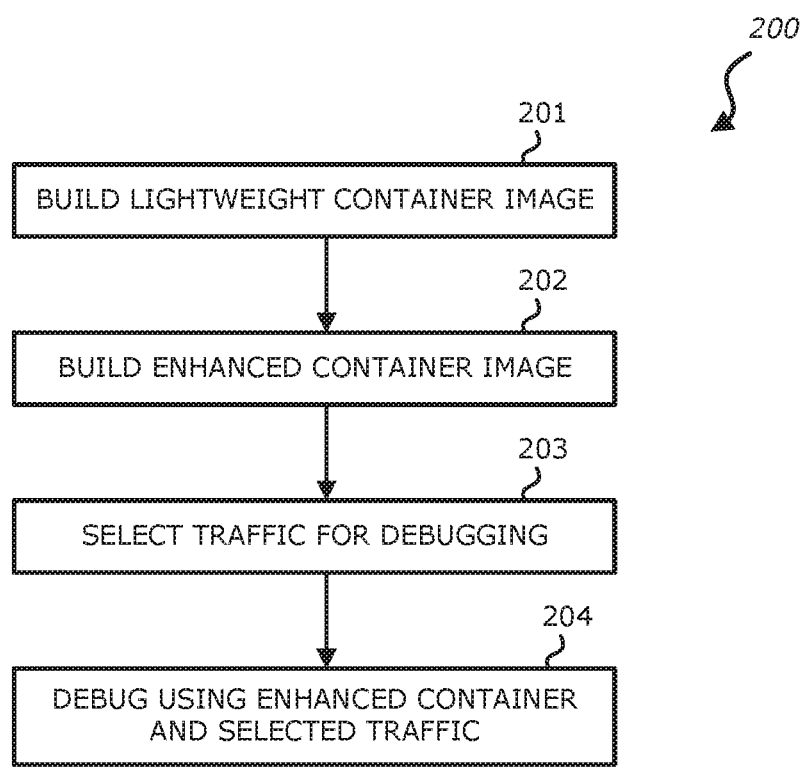
FIG. 2 is a flow diagram for explaining an example method for debugging according to an embodiment herein.

FIG. 2 illustrates a flow diagram for explaining an example debugging process according to an embodiment herein. In this regard, the following embodiments may be described as a process 200, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 200 may be performed by processing logic that includes hardware (e.g. circuitry, dedicated logic, etc.), software (e.g., embodied on a non-transitory computer readable medium), or a combination thereof. In one example embodiment, process 200 is executed by the debugging module 125.

Referring to FIG. 2, at block 201 a lightweight container image (such as lightweight container image 160) is built and at block 202 an enhanced container image (such as enhanced container image 165) is built. The enhanced container image is built using a same version of the application as the lightweight container image. In one embodiment, the enhanced container image includes a tag indicating that it is to be used by the system when a request to debug is received.

The container images may be built or generated in a number of suitable ways. As one example, the PaaS layer may provide a service that generates a container image based on source code provided by a developer. In this regard, when an application is deployed, the PaaS layer buildpack service may automatically wrap the application in a container image according to a binary type. This service is sometimes referred to as a "buildpack." Thus, in the embodiment illustrated by FIG. 1, a developer may provide source code to the PaaS layer buildpack service to generate lightweight container image 160 and enhanced container image 165. As another example, the container images may be manually built by a developer.

At block 203, data traffic to be used by the enhanced container for debugging is selected. For example, in production, data traffic (such as incoming http requests) may be generally directed to one or more lightweight containers running from one or more lightweight container images in order to maximize performance and efficiency. At block 203, the developer may select traffic to redirect from the lightweight containers to one or more enhanced containers and/or a workload to be used by the enhanced containers for debugging.

In one embodiment, also at block 203, when a request to debug a workflow is received, a developer may decide which application components need to be debugged and may switch one or more of the lightweight containers to enhanced containers for debugging. For instance, if a problem that occurs during application deployment is severe, it may be necessary to switch all of the containers to enhanced containers for debugging. Since only the containers needed for debugging are switched from lightweight containers to enhanced containers, it is possible to conserve resources.

Traffic may be selected in any suitable way. In one embodiment, traffic is selected by specifying a specific tenant workload. In this regard, if a particular tenant or customer is having problems with the application, traffic from that tenant or customer may be redirected to an enhanced container. In one embodiment, traffic is selected by flagging all of the data traffic for a specific service. In one embodiment, traffic is selected by specifying a time window in which the traffic is duplicated and redirected. In one embodiment, traffic is selected by filtering incoming data traffic such as HTTP requests using conditions included in a header. In one embodiment, traffic is selected by specifying a percentage of production traffic to be used for debugging the problem. In one embodiment, traffic is selected by specifying a maximum number of http requests over a time period (e.g., per minute) to redirect to the enhanced container. In one embodiment, data traffic is selected by manually filtering the traffic. For example, a developer may manually specify that a next http request will be duplicated and sent to the enhanced container. In this way, it is possible to select the traffic that is used for debugging such that resources may be conserved.

After the traffic for debugging is selected, a database copy of the traffic is made for any database and/or data sources required for the services of the enhanced container to run. For instance, the PaaS platform may provide a copy data manager.

In one embodiment, the traffic is selectively duplicated using enhanced copy 116 and redirected to the enhanced container. For example, the most recent enhanced copy 116 may be restored by restoring all "point in time" images (e.g., captures of a volume or disc at a specific point in time) from one or more backups or copies stored on cloud storage 106. Note that the term of "copy" or "copies" throughout this application refers to data that is stored according to a variety of data protection methods or processes, such as, for example, backup, replication, mirroring, snapshots, clones, copying, archiving, file system versioning, traffic replay or any other technology. The copied data may be complete copies, diff copies, incremental copies, or any transformation of data representation including but not limited to compression, deduplication and encryption. In addition, combinations and/or multiples of these as parts of a copy (e.g., some parts of the application replicated, some parts backed-up) or sequencing of these (e.g., taking a snapshot, replicating that snapshot, taking a backup of the replicated snapshot, archiving that backup). This is especially relevant for the application bundles where different parts of the application may be protected by different protection technologies.

Since the enhanced copy 116 is restored, it is advantageously possible create a copy of the application in which the configurations, settings and environment (including clocks) appear to the developer to be moved back to those of the run time environment at the time of interest (e.g., the time at which the problem or bug was detected), even if available services have changed or been removed. In fact, it becomes possible to provide the developer with a copy of the application where the environment is identical to the environment at the time of the problem or bug. Furthermore, it becomes advantageously possible to reconfigure the environment of the system 100 to provide more information for debugging, such as statistics and logs.

In one embodiment, after restoring enhanced copy 116, recent requests and other data traffic received by the application are stored in order to run the enhanced copy. This traffic can be stored in any one or more of storage array 104, cloud storage 106 and other data sources 150. In this example, only requests made since the time of the most recent enhanced copy 116 need to be stored. Accordingly, it is advantageously possible to manage this process using random access memory (RAM) instead of other resources. In this embodiment, enhanced copy 116 may be run using the stored traffic. In other embodiments, enhanced copy 116 may be run using non-production data (e.g., historical data, development test data or backend data). For example, in situations where a problem or bug is related to interactions between services or to an amount of traffic, it is not necessary to obtain and use the actual production data that has been backed up (copied) and stored. Rather, according to this embodiment, debugging module 125 uses data similar to the actual production data. On the other hand, in situations where a problem or bug is specific to the actual data on production, enhanced copy 116 is run using the actual production data associated with the time of interest. In this way, workloads and data traffic from the application may be replicated, replayed and used for debugging.

In one embodiment, the traffic selected for debugging may also be manipulated. For example, the data may be obfuscated in cases in which the production data is sensitive, or in which it is otherwise necessary to provide "safe" data to developers, such that in-line data obfuscation is supported. As another example, the enhanced container image may only have read privileges to minimize data movement if a developer does not need to change data. As another example, a copy on write feature may be supported by the enhanced container image for some data sources (such as key value stores or object stores) to minimize data movement.

In one embodiment, an application programming interface (API) gateway routes the incoming data traffic (e.g., http requests) to the lightweight container and the enhanced container.

At block 204, debugging is performed (for instance, by debugging module 125) using the enhanced container and the selected data traffic. In one embodiment, a developer may access the enhanced container, open the IDE and reproduce a problem that occurs in production. After debugging the problem, a new application deployment is generated, along with new dual container images, namely a new lightweight container image and a new enhanced container image.

By virtue of using the enhanced container image, it is typically possible to maintain an application during deployment, since the enhanced container image includes the capabilities to by debug and resolve problems that occur during deployment of the application. In addition, it is typically possible to maintain the application during deployment conveniently, quickly and efficiently, without having to sacrifice quality of the debugging.

Figure 3:
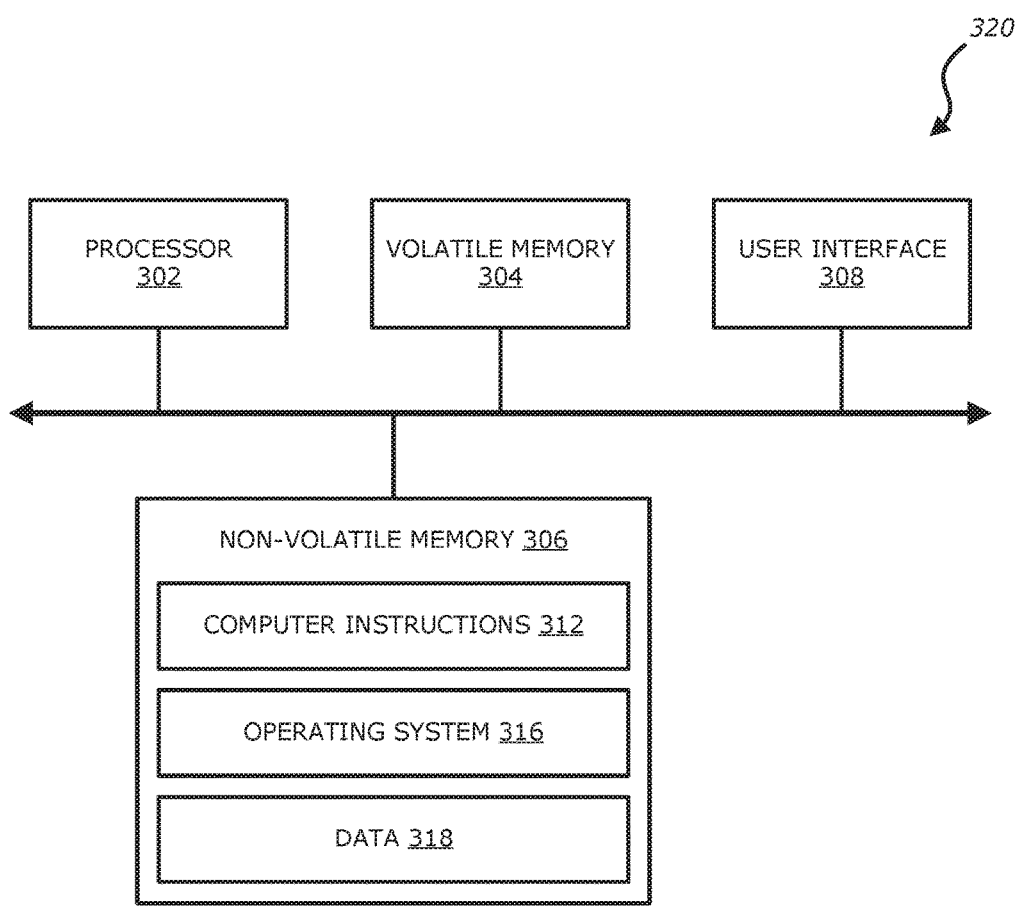
FIG. 3 is a block diagram for explaining an example data processing system on which any portion of the process of FIG. 2 may be implemented according to an embodiment herein.

FIG. 3 illustrates a block diagram of an example of a data processing system which may be used with one embodiment herein. For example, system 320 may represent any of data processing systems described above performing any of the processes or methods described above. System 320 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 320 is intended to show a high level view of many components of the computer system. However, it is to be understood that additional components may be present in certain implementations and furthermore, different arrangement of the components shown may occur in other implementations. System 320 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 320 includes a processor 302, a volatile memory 304, a non-volatile memory 306 (e.g., hard disk) and a user interface (UI) 308 (e.g., a graphical user interface, a mouse, a touch pad, a touch sensitive screen, a display, a pointer device such as a stylus, a keyboard, and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200). In addition, executable code and/or data of a variety of operating systems, device drivers, firmware (e.g., input output basic system or BIOS), and/or applications can be loaded in the memory and executed by processor 302.

In one embodiment, system 320 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 320

To provide for persistent storage of information such as data, applications, one or more operating systems and so forth, a mass storage (not shown) may also couple to processor 302. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 302, e.g., via a serial peripheral interface (SPI). This flash device may provide for non-volatile storage of system software, including a basic input/output software (BIOS) as well as other firmware of the system.

Processor 302 may represent a single processor or multiple processors with a single processor core or multiple processor cores included therein. Processor 302 may represent one or more general-purpose processors such as a microprocessor, a central processing unit (CPU), or the like. More particularly, processor 302 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 302 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 302, which may be a low power multi-core processor socket such as an ultra-low voltage processor, may act as a main processing unit and central hub for communication with the various components of the system. Such processor can be implemented as a system on chip (SoC).

According to one example embodiment, debugging module 125 is stored in non-volatile memory 306 and is executed by the processor 302 to cause system 320 to function in accordance with the techniques discussed herein.

FIG. 3 is merely one example of a particular implementation and is merely intended to illustrate the types of components that may be present in the system 320. Note that while system 320 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

The processes described herein are not limited to the specific examples described. For example, process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 200 can be implemented in any combination hardware devices and software components.

Embodiments of the present invention are not described with reference to any particular programming language. It will be appreciated that a variety of programming languages may be used to implement the teachings of embodiments of the invention as described herein.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A method comprising:
   providing a lightweight container image and an enhanced container image concurrently in a cloud platform, wherein the lightweight container image and the enhanced container image is generated using a same version of an application, wherein the enhanced container image additionally includes an integrated development environment having support for debugging applications and developing applications;
   receiving, at the cloud platform, a request for debugging a problem that occurred during execution of the application in the lightweight container image;

directing, by the cloud platform, selected traffic from the lightweight container image to the enhanced container image, wherein the integrated development environment is opened for reproducing the problem; and generating a new light weight container image and new enhanced container image using the application after the problem is fixed.

2. The method of claim 1 wherein the enhanced container image comprises one or more of the following:
debug information;
source code of the application;
a network port that is open for remote connection;
a binary that is uncompressed and encrypted;
a full version of a script that has been obfuscated;
an installed integrated development environment;
a metrics controller to collect metrics regarding execution of the source code;
an interface enabling remote connection to a virtual machine; and
a base container image including an operating system having process monitoring tools.

3. The method of claim 1 wherein the lightweight container image includes an operating system having less capabilities than an operating system of enhanced container image.

4. The method of claim 1 wherein the enhanced container image is built using the same version of the application as used to build the lightweight container image.

5. The method of claim 1 wherein selection of the data traffic for debugging the problem comprises one or more of the following:
specifying a specific tenant workload;
flagging full traffic for a specific service;
specifying a time window in which data is duplicated and redirected;
filtering incoming data traffic using conditions included in a header;
specifying a percentage of production traffic;
specifying a maximum number of http requests over a time period; and
specifying that a next http request will be duplicated.

6. The method of claim 1 wherein the selected data traffic for debugging the problem is historical data.

7. The method of claim 1 wherein the selected data traffic for debugging the problem is recent application data traffic.

8. A data processing system comprising:
electronic hardware circuitry constructed to:
provide a lightweight container image and an enhanced container image concurrently in a cloud platform, wherein the lightweight container image and the enhanced container image is generated using a same version of an application, wherein the enhanced container image additionally includes an integrated development environment having support for debugging applications and developing applications;
receive, at the cloud platform, a request for debugging a problem that occurred during execution of the application in the lightweight container image;
direct, by the cloud platform, selected traffic from the lightweight container image to the enhanced container image, wherein the integrated development environment is opened for reproducing the problem; and
generate a new light weight container image and new enhanced container image using the application after the problem is fixed.

9. The system of claim 8 wherein the enhanced container image comprises one or more of the following:
debug information;
source code of the application;
a network port that is open for remote connection;
a binary that is uncompressed and encrypted;
a full version of a script that has been obfuscated;
an installed integrated development environment;
a metrics controller to collect metrics regarding execution of the source code;
an interface enabling remote connection to a virtual machine; and
a base container image including an operating system having process monitoring tools.

10. The system of claim 8 wherein the lightweight container image includes an operating system having less capabilities than an operating system of enhanced container image.

11. The system of claim 8 wherein the enhanced container image is built using the same version of the application as used to build the lightweight container image.

12. The system of claim 8 wherein selection of the data traffic for debugging the problem comprises one or more of the following:
specifying a specific tenant workload;
flagging full traffic for a specific service;
specifying a time window in which data is duplicated and redirected;
filtering incoming data traffic using conditions included in a header;
specifying a percentage of production traffic;
specifying a maximum number of http requests over a time period; and
specifying that a next http request will be duplicated.

13. The system of claim 8 wherein the selected data traffic for debugging the problem is historical data.

14. The system of the claim 8 wherein the selected data traffic for debugging the problem is recent application data traffic.

15. A non-transitory computer-readable storage medium storing computer-executable instructions, the instructions causing a machine to execute a process comprising:
providing a lightweight container image and an enhanced container image concurrently in a cloud platform, wherein the lightweight container image and the enhanced container image is generated using a same version of an application, wherein the enhanced container image additionally includes an integrated development environment having support for debugging applications and developing applications;
receiving, at the cloud platform, a request for debugging a problem that occurred during execution of the application in the lightweight container image;
directing, by the cloud platform, selected traffic from the lightweight container image to the enhanced container image, wherein the integrated development environment is opened for reproducing the problem; and
generating a new light weight container image and new enhanced container image using the application after the problem is fixed.

16. The non-transitory computer-readable storage medium of claim 15 wherein the enhanced container image comprises one or more of the following:
debug information;
source code of the application;
a network port that is open for remote connection;
a binary that is uncompressed and encrypted;

a full version of a script that has been obfuscated;

an installed integrated development environment;

a metrics controller to collect metrics regarding execution of the application;

an interface enabling remote connection to a virtual machine; and a base container image including an operating system having process monitoring tools.

17. The non-transitory computer-readable storage medium of claim 15 wherein the lightweight container image includes an operating system having less capabilities than an operating system of enhanced container image.

18. The non-transitory computer-readable storage medium of claim 15 wherein the enhanced container image is built using the same version of the application as used to build the lightweight container image.

19. The non-transitory computer-readable storage medium of claim 15 wherein selection of the data traffic for debugging the problem comprises one or more of the following:

specifying a specific tenant workload;

flagging full traffic for a specific service;

specifying a time window in which data is duplicated and redirected;

filtering incoming data traffic using conditions included in a header;

specifying a percentage of production traffic;

specifying a maximum number of http requests over a time period; and specifying that a next http request will be duplicated.

20. The non-transitory computer-readable storage medium of claim 15 wherein the selected data traffic for debugging the problem is historical data.

21. The non-transitory computer-readable storage medium of claim 15 wherein the selected data traffic for debugging the problem is recent application data traffic.

* * * * *